United States Patent Office 3,195,929
Patented July 20, 1965

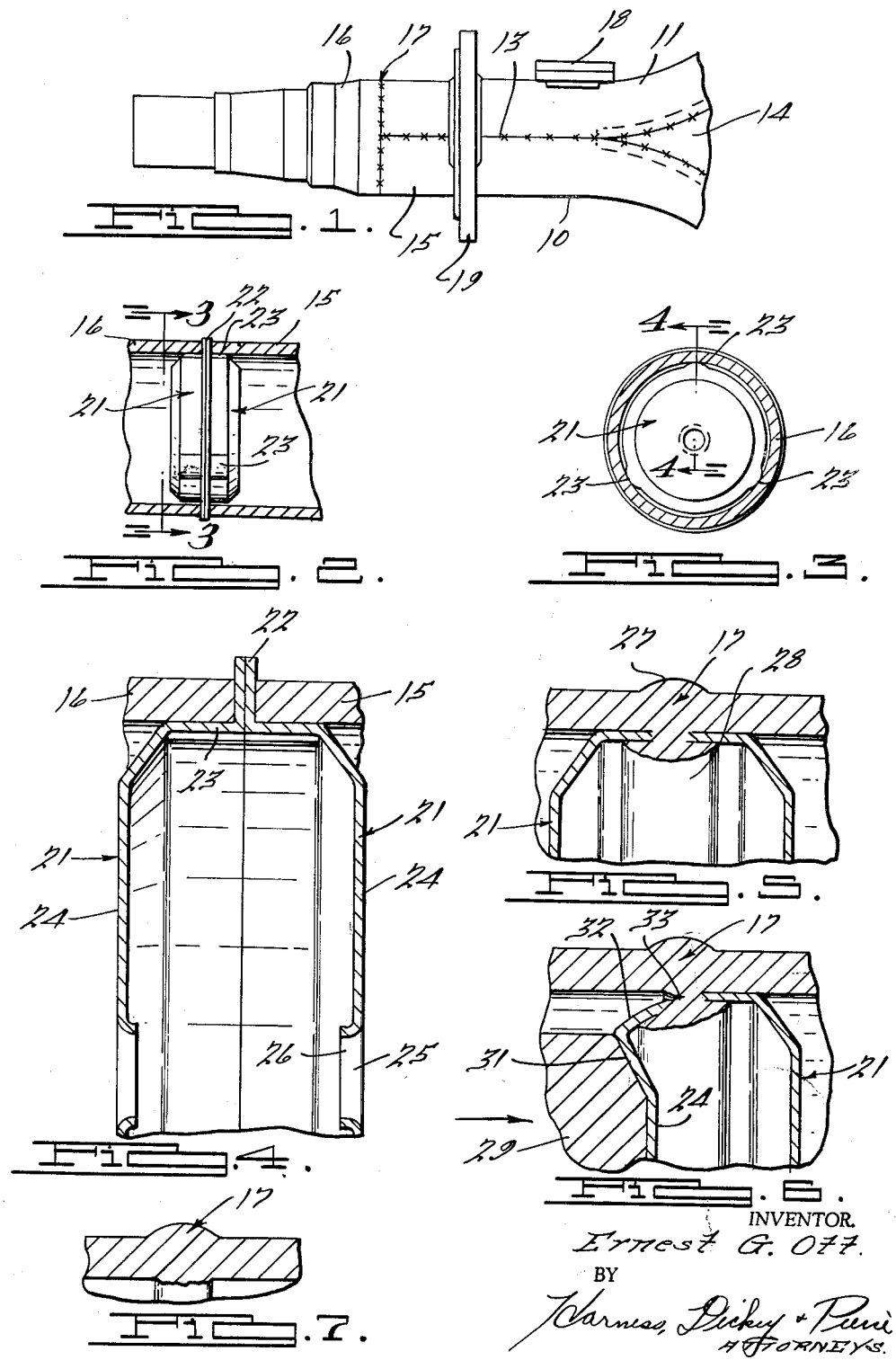

3,195,929
FLASH COLLECTOR AND METHOD
Ernest G. Ott, Dearborn, Mich., assignor to American Metal Products Company, Detroit, Mich., a corporation of Michigan
Filed Aug. 22, 1962, Ser. No. 218,622
5 Claims. (Cl. 285—22)

This invention relates to steel fabrication and particularly to the use of cuplike elements at a cylindrical joint to be butt-welded which collect the internal flash material produced during the butt welding operation.

Difficulty has always been experienced when producing butt welds on tubular members when removing the flash material which adheres to the inside of the resulting tubular structure. By way of example, the invention is illustrated as being applied to the butt welding of a drawn cylindrical spindle to a cylindrical end of a welded axle housing similar to that illustrated and described in the R. J. Williams Patent No. 3,015,238, which was originally assigned to the assignee of the present invention.

Flanged cuplike elements are press fitted into the ends of the spindles and those of the housing, and the spindles with the flanges over the ends are abutted against the flanges on the ends of the housing with the spindles in exact aligned relation to the tubular ends of the housing. Thereafter current is applied through the joints to form the butt welds as the spindles are advanced toward the housing to cause the molten metal to intermingle and bulge outwardly and inwardly of the joint in the well-known manner. All of the flash material from the weld at the interior of the joint is caught within the facing cuplike elements and prevented from engaging and adhering to the wall, and the difficult operation of cleaning the internal wall is thereby eliminated. By pushing on the central wall of the cuplike elements, the weld material joined thereto is torn loose from that of the joint and the cuplike elements are ejected from the assembly and scrapped. Flanged apertures may be provided through the central wall of the cuplike elements to permit the escape of gases which accumulate therewithin during the butt welding operation while preventing the flash material from passing therethrough.

Accordingly, the main objects of the invention are: to produce a butt weld on tubular elements in a manner to eliminate the flash and weld material from the interior of the resulting length of tubing; to provide a flange on flash receiving cups which are frictionally retained in the ends of the tubular elements and which are moved into abutted relation and burned away during the butt welding operation while the flash material interiorly of the tubular elements is collected within the abutted pair of cuplike elements; to employ the wall of the cuplike elements as a breaking lever and a shearing element for prying and tearing the metal from the internal portion of the joint as the cuplike elements are forced longitudinally of the resulting tubular section, and, in general, to provide a method and means for eliminating flash material from the interior of butt welded tubular elements which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken view in elevation of a fabricated axle housing having a butt weld made thereon in the manner embodying the present invention;

FIG. 2 is a sectional view of the structure illustrated in FIG. 1, with the tubular sections in position to be welded;

FIG. 3 is a sectional view of the structure illustrated in FIG. 2, taken on the line 3—3 thereof;

FIG. 4 is an enlarged broken sectional view of the structure illustrated in FIG. 3, taken on the line 4—4 thereof, before the welding operation has been performed on the assembled sections;

FIG. 5 is a view of the structure illustrated in FIG. 4 after the welding operation;

FIG. 6 is a view of the structure illustrated in FIG. 5 during the time that the flash collecting cuplike elements are being removed from the interior of the tube, and FIG. 7 is a view of the structure illustrated in FIG. 6 after the flash collecting cuplike elements have been removed from the welded area.

In FIG. 1 a fabricated rear axle housing is illustrated made from a pair of oppositely presenting humped channel elements 10 and 11 which are welded along mating lines 13 at opposite sides of the housing. Gusset plates 14 join the diverging portions of the channel elements and form therewith the central opening of the central banjo housing portion. The end portion 15 of the illustrated housing section is tubular in form, preferably of cylindrical section, and has a spindle 16 disposed in extension thereof and secured thereto by a butt weld joint 17. A spring pad 18 and a brake flange 19 are illustrated as being welded or otherwise secured to the illustrated housing section.

As illustrated in FIGS. 2, 3 and 4, each of the ends of the spindle 16 and housing section has a flash receiving cuplike element 21 press fitted therein. Each of the cuplike elements 21 has an edge flange 22 which limits the inward movement of the elements and when in abutted relation forms a hollow container. Protruding portions 23 are provided in the walls of the cuplike elements 21 on a diameter slightly larger than the interior diameter of the ends of the sections to be welded so as to produce a press fit of the elements therewithin. The walls 24 of the cuplike elements 21 have central apertures 25 with inwardly directed flanges 26 provided thereabout to permit the escape of accumulated gas under pressure while preventing the flash material from passing through the apertures 25 due to the inwardly directed flanges 26 thereabout.

After the cuplike elements have been assembled on the ends of the spindle and housing elements, as illustrated in FIGS. 2, 3 and 4, current is supplied to the ends and through the flanges 22 as pressure is applied between the ends axially thereof. A butt weld operation is performed as the metal of the ends of the cylindrical elements becomes molten along with that of the flanges 22, and as the ends are relatively moved toward each other, the molten metal is forced outwardly of the joint carrying any dross or oxides from the welded area. This leaves the metal of the two ends in complete intermingled relation and provides a joint after the metal is cooled which is stronger than the metal of the elements on each side thereof. The splash of metal resulting from the butt welding operation at the inner part of the joint will be trapped between the two cuplike elements 21 and the heated gases which may build up pressure therewithin may pass out through the apertures 25 in the wall portions 24 of the elements.

FIG. 4 discloses the assembly of the joint before the welding operation, while FIG. 5 shows the same section thereof after the ends have been but-welded together. It may be noted that the flanges 22 of the cuplike elements 21 have been burned away during the welding operation and that the material of the weld is bulged outwardly at 27 and has been moved inwardly at the adjacent edges of the cup forming an annulus 28 therewithin. As illustrated in FIG. 6, a ram 29 is advanced against one of the walls 24 of the cuplike elements to force it toward the wall of the other element and pry and tear the annulus 28 from the weld 17 and push the elements with the flash material therein from the tubular portion of the welded sections.

The ram has a truncated portion 31 at the forward face which produces the bending of the wall 32 of the cup and the tearing of the joined metal at the points 33 of the weld as the ram continues to advance. This frees the elements 21 from the weld 17 and shears the annulus 28 of weld material from the material of the weld 17 as the ram continues to advance. The cuplike elements are pushed into the area of the banjo portion of the housing from each end thereof and are removed through the banjo opening. This method not only eliminates the flash material from the inner surface of the welded sections but also removes the excessive weld material which accumulates on the inner weld area without the necessity of employing a grinding and cleaning operation which is time consuming and expensive. FIG. 7 discloses the section of FIGS. 5 and 6 after the cuplike elements and annulus of welding material 28 have been removed, illustrating the complete commingling of the material at the joint and the clean wall adjacent thereto.

What is claimed is:

1. The combination with a pair of tubular ends to be butt-welded together of flanged cuplike elements disposed within the ends with the flanges extending thereover, the facing cup-shaped elements forming a chamber spanning the ends for receiving the internal flash material during the welding operation.

2. The combination with a pair of tubular ends to be butt-welded together of flanged cuplike elements disposed within the ends with the flanges extending thereover, the facing cup-shaped elements forming a chamber spanning the ends for receiving the internal flash material during the welding operation, each cuplike element having a bottom web, a peripheral wall and a wall of truncated conical section joining the web and the peripheral wall.

3. The combination with a pair of tubular ends to be butt-welded together of flanged cuplike elements disposed within the ends with the flanges extending thereover, the facing cup-shaped elements forming a chamber spanning the ends for receiving the internal flash material during the welding operation, said cuplike elements having a base web joined by a peripheral wall, the peripheral wall having spaced expanded areas which produce a frictional engagement with the inner surface of the tubular ends.

4. The combination with a pair of tubular ends to be butt-welded together of flanged cuplike elements disposed within the ends with the flanges extending thereover, the facing cup-shaped elements forming a chamber spanning the ends for receiving the internal flash material during the welding operation, said cuplike elements having a base web joined by a peripheral wall, the base web of at least one cuplike element having an opening therein through which gas under pressure may escape during the welding operation.

5. The combination with a pair of tubular ends to be butt-welded together of flanged cuplike elements disposed within the ends with the flanges extending thereover, the facing cup-shaped elements forming a chamber spanning the ends for receiving the internal flash material during the welding operation, said cuplike elements having a base web joined by a peripheral wall, the base web of at least one cuplike element having an opening therein through which gas under pressure may escape during the welding operation, the metal at the opening being flanged inwardly a sufficient distance to prevent the flash material from the weld from passing outwardly therethrough.

References Cited by the Examiner

UNITED STATES PATENTS

| 1,980,561 | 11/34 | Wagner | 113—112 X |
| 2,241,216 | 5/41 | Phelps | 219—104 |

FOREIGN PATENTS

| 463,802 | 4/37 | Great Britain. |

RICHARD M. WOOD, *Primary Examiner.*